US008345945B2

(12) United States Patent
Song et al.

(10) Patent No.: US 8,345,945 B2
(45) Date of Patent: Jan. 1, 2013

(54) MOTION ARTIFACT COMPENSATION

(75) Inventors: Hee Kwon Song, Moorestown, NJ (US); Wei Lin, Newark, DE (US)

(73) Assignee: The Trustees Of The University Of Pennsylvania, Philadelphia, PA (US)

(*) Notice: Subject to any disclaimer, the term of this patent is extended or adjusted under 35 U.S.C. 154(b) by 985 days.

(21) Appl. No.: 12/297,963

(22) PCT Filed: Apr. 20, 2007

(86) PCT No.: PCT/US2007/067136
§ 371 (c)(1),
(2), (4) Date: Feb. 4, 2009

(87) PCT Pub. No.: WO2007/124450
PCT Pub. Date: Nov. 1, 2007

(65) Prior Publication Data
US 2009/0316971 A1 Dec. 24, 2009

Related U.S. Application Data

(60) Provisional application No. 60/794,241, filed on Apr. 21, 2006.

(51) Int. Cl.
*G06K 9/40* (2006.01)
*G06T 5/00* (2006.01)
(52) U.S. Cl. ........................................ 382/131; 382/275
(58) Field of Classification Search .................. 382/275, 382/131, 107; 600/410
See application file for complete search history.

(56) References Cited

U.S. PATENT DOCUMENTS

| 5,546,472 | A | * | 8/1996 | Levin ............................. 382/131 |
| 6,073,041 | A | * | 6/2000 | Hu et al. ........................ 600/410 |
| 6,480,242 | B1 | * | 11/2002 | Okada et al. ................... 348/807 |
| 6,630,828 | B1 | | 10/2003 | Mistretta et al. |
| 6,683,454 | B2 | | 1/2004 | Rehwald et al. |
| 6,924,643 | B2 | | 8/2005 | Sussman et al. |
| 7,005,853 | B2 | | 2/2006 | Tsao et al. |
| 7,348,776 | B1 | * | 3/2008 | Aksoy et al. ................... 324/307 |
| 2002/0180436 | A1 | * | 12/2002 | Dale et al. ....................... 324/307 |
| 2003/0130574 | A1 | * | 7/2003 | Stoyle ........................... 600/410 |

OTHER PUBLICATIONS

Ehman, R.L. et al., "Adaptive technique for high-definition MR imaging of moving structures," Radiology, 1989, 173, 255-263.
Fu, Z.W. et al., "Orbital navigator echoes for motion measurements in magnetic resonance imaging," Magn. Reson. Med., 1995, 34, 746-753.

(Continued)

*Primary Examiner* — Jon Chang
(74) *Attorney, Agent, or Firm* — Woodcock Washburn, LLP

(57) ABSTRACT

A technique for correcting translational and rotational motion of an object, such as an object in a magnetic field, utilizes the k-space representation of the object. An initial region in the k-space representation is used as a motion-free reference region, indicative of the motion-free object. Motion-free data adjacent to the initial region are then estimated by extrapolating from the initial region, and the extrapolated data are subsequently used to estimate motion by correlating it with actual data. Segments adjacent to the initial region are then motion corrected and incorporated into an expanding base region. The expanded base region is used in subsequent correction steps. This process is continued until the entire k-space is motion-corrected. Two different extrapolation methods were used for the purpose of motion estimation: edge enhancement and finite-support solution. One technique is utilized near the k-space center and the other is utilized in the outer k-space regions.

40 Claims, 18 Drawing Sheets

OTHER PUBLICATIONS

Atkinson, D. et al., "Automatic compensation of motion artifacts in MRI," Magn. Reson. Med., 1999, 41, 163-170.

Manduca, A. et al., "Autocorrection in MR Imaging: Adpative motion correction without navigator echoes," Radiology, 2000, 215, 904-909.

Manduca, A. et al., "Automatic retrospective translational motion correction in image space," Proc. ISMRM, 2003, 11, 1058.

W. Lin and H.K. Song, "Extract (Extrapolation and Correlation): A New Ultra-Rapid Motion Correction Technique," Proc. Intl. Soc. Mag. Reson. Med., 2005, 13, 2688.

M. Joy, lecture entitled "MRI—K-Space" dated Jan. 2003.

Jul. 2007 NSF grant "Retrospective Motion Correction Algorithms for in vivo Micro-MRI," BES-0302251.

Stanislav Sykora, "K-space formulation of MRI," Extra Byte, Via R. Sanzio 22C, Castano Primo, Italy 20022 in Stan's Library, vol. 1, Mar. 22, 2005 accessed via the Internet at URL http://www.ebyte.it/library/educards/mri/K-SpaceMRI.html.

W. Lin et al., "Correcting bulk in-plane motion artifacts in MRI using the point spread function," IEEE Transactions on Medical Imaging, Sep. 2005, 24(9), 1170-1176.

W. Lin and H. Song, "Improved optimization strategies for autofocusing motion compensation in MRI via the analysis of image metric maps," Magnetic Resonance Imaging, Jul. 2006, Epub May 23, 2006, 24(6), 751-760.

* cited by examiner

MOTION ARTIFACT COMPENSATION

CROSS-REFERENCE TO RELATED APPLICATIONS

This application is the National Stage of International Application No. PCT/US2007/067136, filed Apr. 20, 2007, which claims the benefit of U.S. Provisional Application No. 60/794,241 filed Apr. 21, 2006, the disclosure of which is incorporated herein by reference in its entirety.

TECHNICAL FIELD

The technical field generally relates to magnetic resonance imaging (MRI) and more specifically relates to correction of translational and rotational motion artifacts of an MR image.

BACKGROUND

Despite advances in magnetic resonance (MR) scanner hardware and imaging techniques, physiologic and involuntary patient motion remains a problem in many applications. Over the years, both prospective and retrospective techniques have been developed for compensating for artifacts resulting from the motion. Among these are physiologic gating, data reordering, and spatial presaturation. Although effective, these techniques are limited to known periodic physiologic movements, and cannot be used for arbitrary motion. One means of compensation for general motion is the method of "navigator echoes," which requires the acquisition of additional projection data during the scan to extract the motion information. In certain fast or high-resolution imaging sequences, however, it may not be desirable or feasible to obtain additional data, since the minimum sequence repetition time (TR) or the total scan time could become prolonged. The use of navigator echoes may also undesirably affect the steady state.

Post-processing techniques also have been used for motion artifact compensation, either without or combined with additional navigator echoes. Some of the earlier methods were only applicable to translational motion, using edge detection to recover motion along read-out direction and an iterative procedure to remove the remaining phase error. These techniques depend on the existence of significant ghosting and sharp object boundaries, which are not always present in in vivo scans. Recently, another post-processing technique, known as autofocusing (or autocorrection), has been proposed. In autofocusing, motion is estimated by optimizing an image metric, a measure of image sharpness and quality, while different trial motions are applied to portions of the k-space data. The process is continued until the entire k-space is corrected.

A major drawback of some existing post-processing techniques is the potentially high computational cost. Autofocusing, for example, often requires at least several minutes to correct for two dimensional (2-D) translational motion only. When rotation is also considered, the computation time could be much higher, typically by a factor equal to the number of trial rotations applied. Although a one-dimensional (1-D) successive approach has been proposed to significantly reduce the computation load, this constrained optimization may be sub-optimal when motion is complex. Furthermore, the time required for motion artifact compensation increases as the range of trial motion is increased.

SUMMARY

Correction of translational and rotational motion artifacts of an object, such as an object in a magnetic field, utilizes extrapolation in a k-space representation of the object to generate a motion-free reference region, and a correlation process to estimate motion. In an example embodiment, magnetic resonance (MR) data are collected and represented in k-space. An initial region in the k-space representation is used as a motion-free reference region, indicative of the motion-free object. Segments adjacent to the initial region are motion corrected and incorporated into an expanding base region. The expanded base region is used in subsequent correction steps. This process is continued until the entire k-space is motion-corrected.

In an example embodiment, two different extrapolation techniques are utilized for motion estimation: edge enhancement and finite-support solution. The finite-support solution technique is utilized near the k-space center, and the edge enhancement technique is utilized in the outer k-space regions. The combination of the two techniques is employed to generate a motion-free reference, whose correlations with acquired data can subsequently determine object motion.

BRIEF DESCRIPTION OF THE DRAWINGS

The features and advantages of motion artifact compensation as described herein are best understood when considering the following description in conjunction with the accompanying drawings.

DESCRIPTION OF ILLUSTRATIVE EMBODIMENTS

A technique as described herein for the correction of both translational and rotational motion in magnetic resonance imaging (MRI), does not require the acquisition of additional data, and comprises a k-space extrapolation step to generate a motion-free reference, followed by a correlation step to estimate motion. Since no additional data are required, high computation efficiency is achieved. Further, the motion search range for translation does not affect the data processing time. Compensation for combined in-plane translation and rotation is demonstrated in both phantom and in vivo experiments, requiring less than 30 seconds while achieving a translational accuracy of ±0.25 pixels and a rotational accuracy of ±0.25 degrees. The technique is robust against noise and various types of motion.

This technique for the correction of motion is referred to herein as k-space extrapolation and correlation (EXTRACT). Proceeding in a center-out fashion, for each segment of k-space data, a motion-free reference is first extrapolated from the central k-space region. Motion information for that data segment is then recovered efficiently by correlating this estimated reference with the actual motion-corrupted data. Since a 2-D correlation could be done rapidly in a single step in Fourier space, the technique is rapid and does not depend on the range of trial translations. A 2-D translational correction of a typical clinical image is thus completed in a matter of seconds, regardless of the range of motion. For combined translation and rotation, EXTRACT typically requires less than 30 seconds, depending on the number of rotation angles searched.

The effect of bulk motion on the acquired k-space data is well established. Translational motion induces a linear phase, and rotational motion causes the same degree of rotation in the k-space data. As described herein, the effects of motion are reversed via the application of a phase factor and data rotation. Furthermore, provided a motion-free data estimated for a k-space segment, motion is derived in an efficient manner via correlation.

Figure 1:
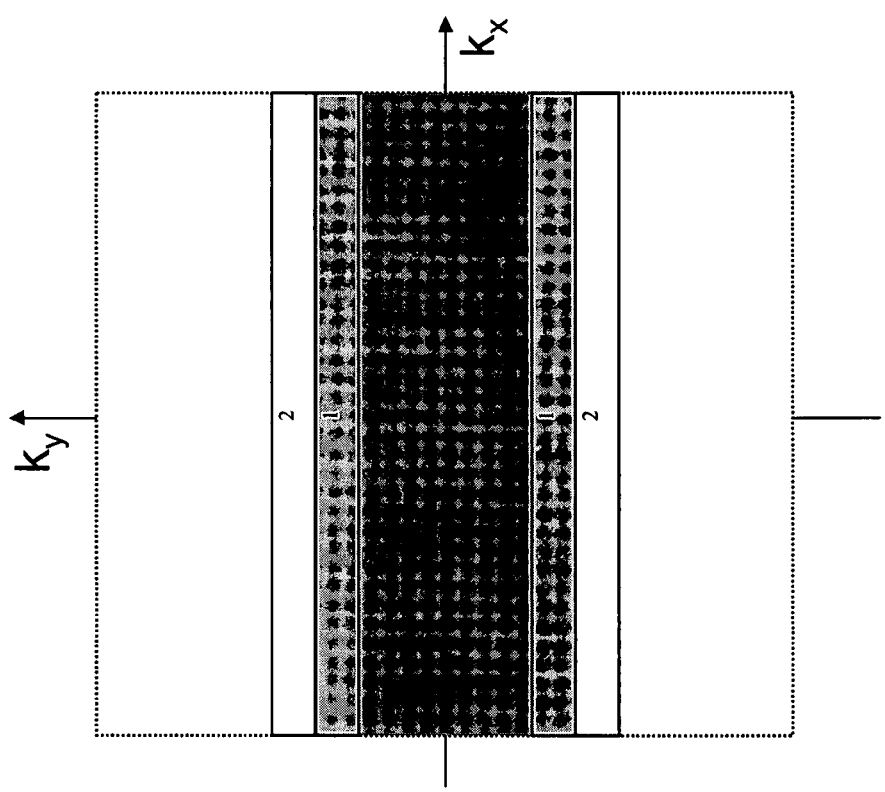
FIG. 1 is an example depiction of the progression in k-space utilized to compensate for motion artifacts of an object in a magnetic field.
Figure 2:
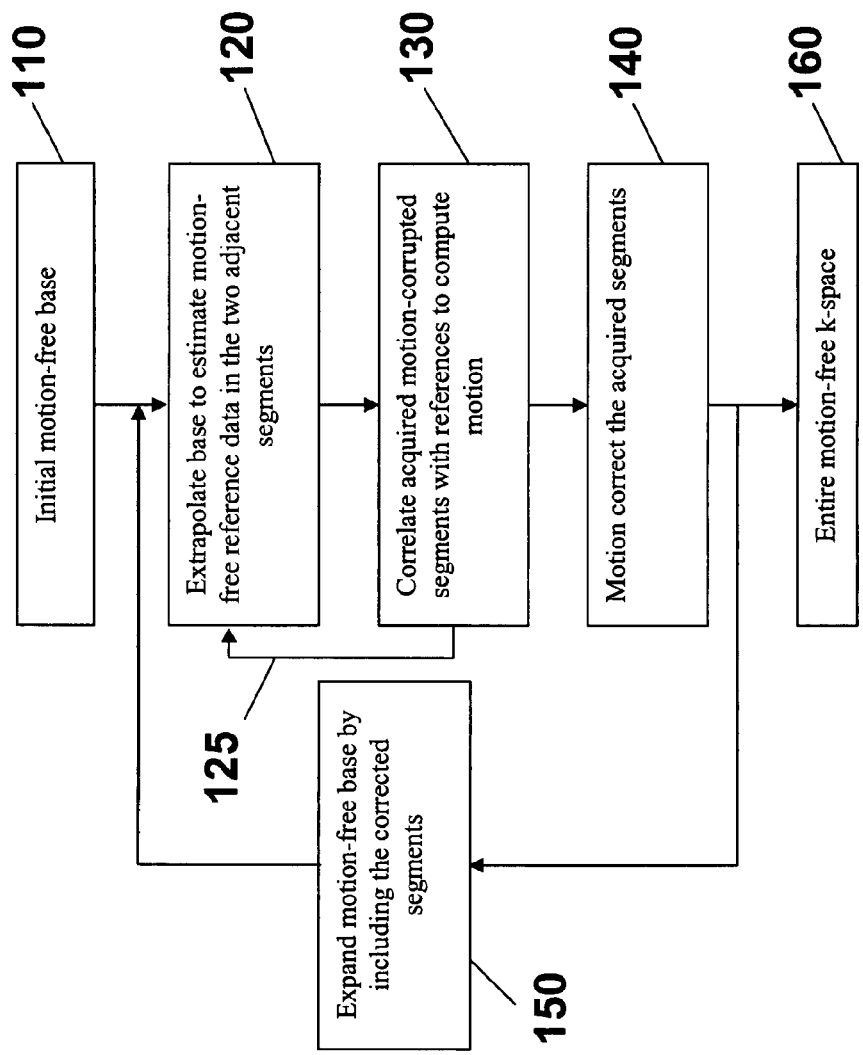
FIG. 2 is a flow diagram of an example process for compensating for motion artifacts of an object in a magnetic field.

FIG. 1 is a depiction of the progression in k-space utilized to compensate for motion of an object in a magnetic field. FIG. 2 is a flow diagram of an example process for compensating for motion of an object in a magnetic field. The progression of motion artifact compensation in EXTRACT starts from an initial motion-free base (central dark gray region of FIG. 1), and the process progressively expands this base until the entire k-space becomes motion-free. In each correction step, data in the two segments adjacent to the base are corrected, which then become a part of the expanding base for the next step. The numbers in FIG. 1 indicate segment correcting order.

As illustrated in FIG. 1 and FIG. 2, in EXTRACT, motion estimation and correction are performed in a progressive manner, starting from the central k-space region and growing outward from immediate previously selected regions. Initially, a small number of views at the center of k-space (the initial base) are assumed to be motion-free (Step 110). From this base, a k-space extrapolation is performed along both positive and negative phase-encoding (y) directions to estimate a "motion-free" reference data in the two adjacent regions (step 120). The correlation value can be utilized to optimize the extrapolation process as indicated by arrow 125. The extrapolated motion-free data is subsequently used to estimate motion in the corresponding views of the acquired data via correlation (step 130). Following motion correction of both segments (step 140), they are incorporated into the expanding motionless base (step 150). The process continues until the entire k-space is corrected (step 160). Although a motion-free initial base cannot always be guaranteed, motion could be minimized by limiting the initial base to a small number of views (for example, 8-16 for a 256-view scan). Thus, the size of the initial base is indicative of the accuracy of the estimate of the amount of motion. It is to be understood that any appropriate number of views can be utilized to limit the initial base. Furthermore, additional base views could be acquired prior to or following the main scan to increase the probability of a motionless base.

The herein described method of k-space extrapolation provides an accurate estimation of subsequent motion. In an example embodiment, two extrapolation techniques are combined. One extrapolation technique is based on edge enhancement, and is based on an assumption that different spatial frequency components of an image have similar zero-crossing positions near an edge. The other extrapolation technique is based on an assumption that certain regions of an image contain no signal. It is to be understood however, that application of theses extrapolation techniques is not bound by the above assumptions.

In the first technique (denoted as EE for edge enhancement), a high-pass ramp filter $|k_y/k_0|$ is first multiplied with the base data in k-space, where $k_0$ is the maximum $k_y$ value of the base. The high-pass ramp filter emphasizes high spatial frequency components, and the reconstructed image mainly comprises edges. The following non-linear operation is performed on the magnitude of the high-pass filtered image to generate an extrapolated signal as denoted in equation (1).

$$|f_{EX}| = \begin{cases} 2|f_{HP}| - T_{EE} & \text{if } |f_{HP}| > T_{EE} \\ |f_{HP}| & \text{if } |f_{HP}| \leq T_{EE}. \end{cases} \quad (1)$$

Here, $f_{EX}$ is the filtered image from which the extrapolated data is to be obtained; $f_{HP}$ is the high-pass filtered complex image, and $T_{EE}$ is a threshold. Equation (1) determines the magnitude of $f_{EX}$. The phase of $f_{EX}$ is set equal to the original phase of the high-pass filtered image. Because of the non-linear process in which the high-frequency components are emphasized, higher spatial frequencies are generated (extrapolated) for the resulting image $f_{EX}$. A two dimensional (2D) Fourier transform (FT) of $f_{EX}$ yields the k-space data from which the data segments adjacent to the base are then used for motion estimation.

In the second technique (denoted as FS for finite-support solution), an inverse FT of the base data is taken along the $k_x$ axis to separate the data into different x-columns, and extrapolation is performed separately on each column along the $k_y$ axis. For each column, an image-space data $f_{ZF}$ is reconstructed from the k-space base ($k_y \in [-k_0, k_0]$) by zero-filling the higher spatial frequencies ($k_y > k_0$). $f_{ZF}$ therefore represents a sinc-interpolated column of the object derived from the original base image. Location of spatial zeros, where no signal is expected, could then be determined by thresholding $f_{ZF}$. With this assumption of spatial zeros, extrapolated signal can be computed using the following matrix operation depicted in equation (2).

$$f_{EX} = ML^t (LML^t)^{-1} f_l \quad (2)$$

Here $f_{EX}$ is the extrapolated signal; M, is a masking diagonal matrix with 1's at non spatial-zero locations and $\xi$ at spatial-zero locations, L is a sinc matrix, and $f_l$ is the spatial signal reconstructed from the motionless base (low-frequency k-space data) without zero-filling. $\xi$ is a regularization constant ranging from 0 to 1, which reflects the level of noise intensity at spatial-zero locations. Equation (2) is the right-hand pseudoinverse of the sinc-interpolation equation in the spatial domain. It minimizes the energy added to the unknown high-frequency components while maintaining known low-frequency components and spatial-zeros.

Both extrapolation techniques contain free parameters: threshold $T_{EE}$ for the edge-enhancement technique; threshold $T_{FS}$ and regularization constant $\xi$ for the finite-support technique. In an example embodiment, these parameters are fine tuned by searching for the maximum correlation value, as described below. Since the FS technique involves a matrix inversion for each column of signal, it has a higher computation cost than the EE technique. However in images in which SNR is limited, optimal $\xi$ value in the FS technique is close to 1. In this case, equation (2) is equivalent to equation (3) below.

$$f_{EX} = \begin{cases} f_{ZF} & \text{if } |f_{ZF}| > T_{FS} \\ 0 & \text{if } |f_{ZF}| \leq T_{FS}. \end{cases} \quad (3)$$

As indicated in equation (3), only a thresholding is involved, and thus the computation cost is reduced as compared to the computational cost of equation (2).

As described above, in an example embodiment the FS extrapolation technique is utilized near the k-space center, and the EE extrapolation technique is utilized in the outer regions of the k-space representation. Accordingly, in an example embodiment, motion compensation is accomplished by implementing the FS extrapolation technique when $k_y \leq k_1$ and utilizing the EE extrapolation technique when $k_y > k_1$, where $k_1$ is the $k_y$ position where the correlation curves of two techniques intersect.

Following the extrapolation of the two higher spatial frequency regions along $k_y$, translational motion is estimated by correlating each partial image reconstructed from each motion-free reference region with that of the acquired motion-corrupted segment. This 2-D correlation procedure is performed through data multiplication in k-space as depicted in equation (4).

$$C(x,y) = I_S^{ref} \otimes I_S = FT^{-1}[(S^{ref})^* \times S]. \quad (4)$$

Here $\otimes$ denotes cross correlation, $S^{ref}$ and $S$ are k-space reference and acquired segments, $I^{ref}$ and $I$ are the corresponding reconstructed partial-images, and $(x,y)$ is the relative displacement therebetween. The correlation function shown in equation (4) is a complex number. As shown in the Appendix, for a segment size of one phase-encoding line, $C(x,y)$ equals the correlation function of a projection along the readout (x) axis, multiplied by a phase term determined by the shift along y. Translational motion along the x-direction will shift the correlation maximum by the same amount, while along the y-axis there will only be a phase shift. Therefore, a maximum search operation on the real component of $C(x,y)$ is used to recover both x and y motion.

Figure 3:
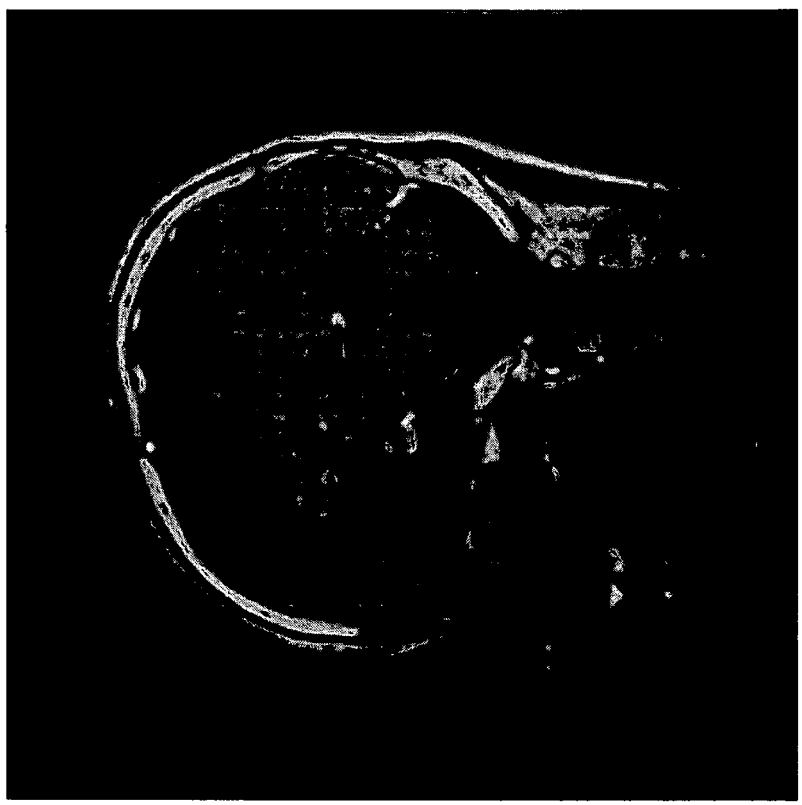
FIG. 3 is an illustration of an example motion-free image.
Figure 4:
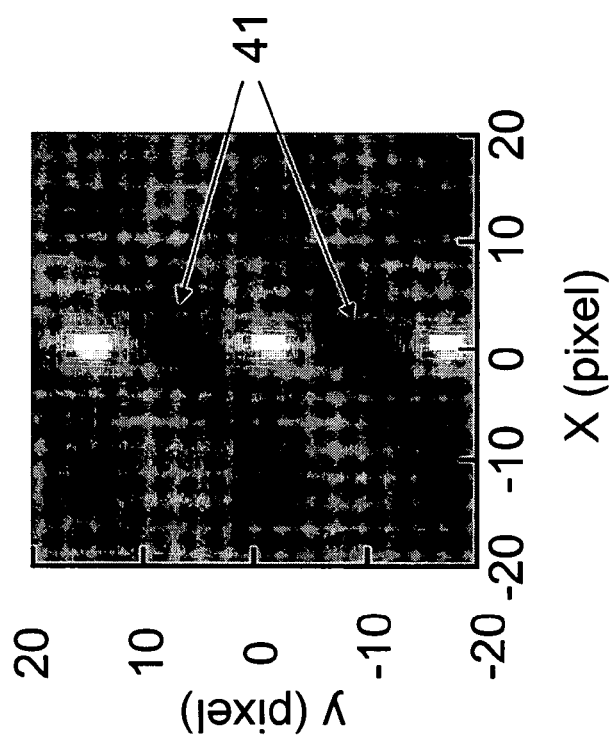
FIG. 4 is an example of 2D correlation function $C(x,y)$.
Figure 5:
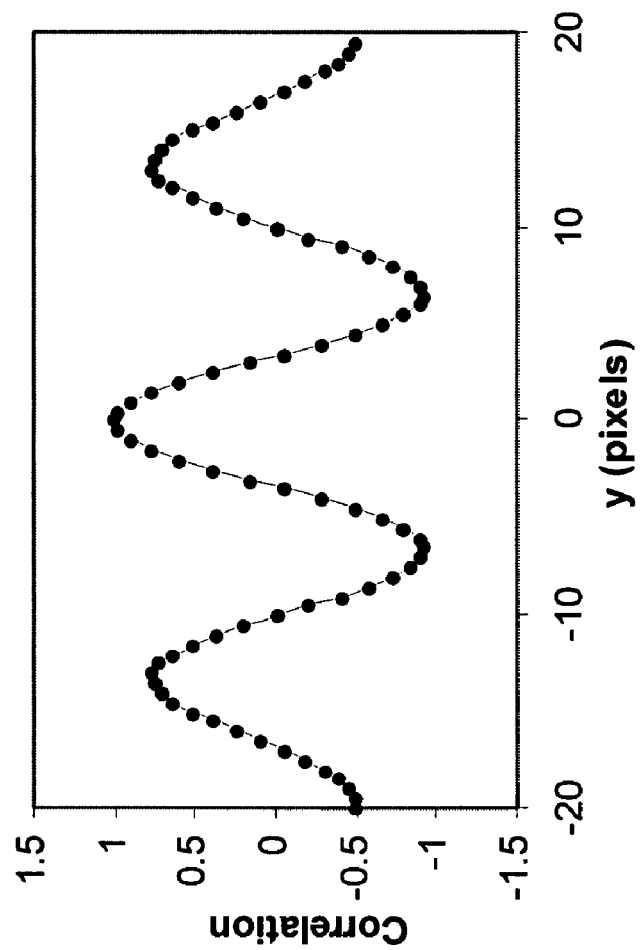
FIG. 5 is an example of the profile of the real component of $C(x,y)$ along $x=0$ line.
Figure 6:
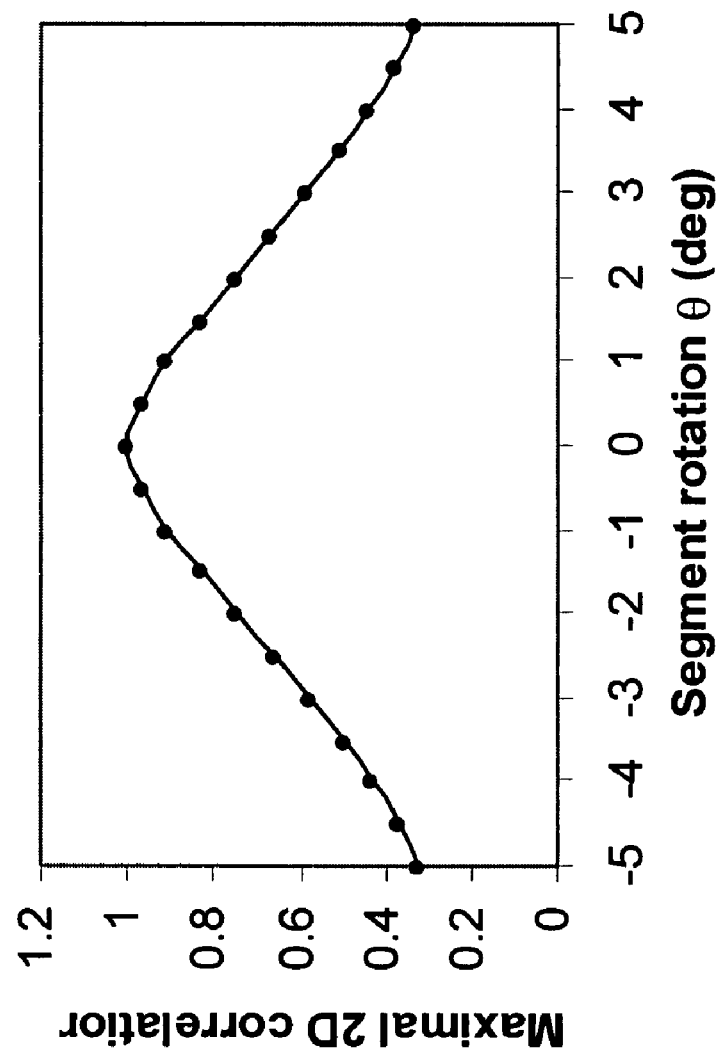
FIG. 6 is an example of the maximum 2D correlation values when the original segment was correlated with rotated segments.

The properties of the correlation function, using a motion-free dataset, are illustrated in FIG. 3, FIG. 4, FIG. 5, and FIG. 6. FIG. 3 is an illustration of an example motion-free image. FIG. 4 shows that multiple local maxima 41 occur along the vertical x=0 line, due to the phase modulation term. Because the segment of k-space depicted in FIG. 4 contains more than one $k_y$ line, the oscillating pattern decays with distance from y=0 as shown in FIG. 5, making it possible to detect the true y shift. To achieve sub-pixel motion estimation, following multiplication of the acquired and extrapolated data segments, in an example embodiment, the k-space is zero-filled by a factor $\alpha$ prior to taking the inverse FT, resulting in a resolution gain of $\alpha$. To compensate for rotation in addition to translation, multiple copies of the acquired dataset are first rotated by various angles, and the corresponding segments of each rotated data correlated with the motion-free reference. The global correlation maximum is then used to determine both rotation $\theta$ and translation $(x,y)$. As depicted in FIG. 6, the maximum correlation values from 2-D translations is plotted against rotation angle $\theta$. Since the dataset in this example is motion-free, the maximum correlation occurs at $\theta=0$ as shown in FIG. 6.

In an example embodiment, the correlation technique is further extended to estimate three dimensional (3D) translation and rotation. In an acquired 3D dataset having two phase-encoding loops: an inner slice-encoding $k_z$ loop and an outer phase-encoding $k_y$ loop, k-space is partitioned into thin sections, each consisting of one or several contiguous $k_x$-$k_z$ planes for which one set of motion parameters to be estimated. A 3D correlation function $C(x,y,z)$ between extrapolated and acquired data is computed, whose maximum yields the translation along all three directions. In addition, acquired motion-corrupted 3D sections are rotated to various orientations of $(\theta,\phi,\alpha)$ prior to their correlations with the extrapolated section. The resulting six dimensional (6D) global correlation maximum are used to determine 3D rotation as well as 3D translation.

The performance of the EXTRACT technique was evaluated in a simulated motion experiment. A raw (complex), axial dataset of a head without motion was acquired using a 2-D spin-echo sequence with the following parameters: TR/TE 500/15 msec, 24 cm FOV, 5 mm thickness. Uniformly distributed random numbers in the range of [−5.0, 5.0] pixels were generated for each view for both x and y translations and the motion-corrupted complex k-space data were produced according to equation (5) below.

$$S_{(\Delta x, \Delta y)} = S_{(0,0)} \exp[-j2\pi(k_x \Delta x + k_y \Delta y)] \quad (5)$$

The EXTRACT technique was then applied using an initial base of 3 central phase-encoding views (where no motion was applied) and a segment size of 1 line (view-by-view correction). The value for $k_1$ was chosen to be 20, based on the correlation curve. For the FS extrapolation technique (views with $k_y \leq k_1$), both $T_{FS}$ and $\xi$ were determined by a local search to maximize the resulting correlation value. For the EE extrapolation technique ($k_y > k_1$), the optimal value of $T_{EE}$ was searched (between 1 to 10 times the noise standard deviation) at each step, and the threshold level that yielded the highest correlation value was used for the data extrapolation.

The EXTRACT technique was further examined and compared with a navigator echo technique in 26 high-resolution in vivo wrist datasets. In a separate study investigating the effects of drug treatment on the trabecular bone architecture, patients were instructed to remain as motionless as possible and the wrist stabilized using an immobilization device. But, because of the small pixel size, motion was often observed and was corrected using navigator echoes. 32 axial slices using a 3-D FLASE sequence [21] with the following parameters were acquired: TR/TE 80/9.5 msec, 7×4 cm FOV, 0.4 mm section thickness, 512×288×32 matrix (137×137×410 µm³ resolution), 140° flip angle, 7.8 kHz bandwidth, 12.3 min scan time. Due to the structural anisotropy of trabecular bone, in which the trabecular elements are preferentially oriented along the slice (z) direction, as well as the larger voxel size along the slice direction, in-plane motion causes the most severe artifacts, and thus motion only along x and y axes was addressed. An alternating navigator echo was incorporated at the end of each readout to recover both readout and phase-encoding direction translations. In the 3D FLASE sequence, phase-encoding along the slice direction (z) is the inner-most loop, and with TR=80 ms and 32 slices, the execution time of the 32 z-encodes for a fixed y-phase-encoding step is approximately 2.5 sec. To a first degree approximation, only motion occurring between different y-encoding steps was considered. Therefore an inverse FFT along the z-direction was first performed to separate the slices. Due to the relatively low SNR (~10) of these high-resolution images, the correlation maps were computed independently on 16 consecutive slices and summed, and the maximum value of the combined map accepted as the motion for each segment. An initial base of 15 $k_y$ lines was used in this experiment. A $k_1$ value of 64 was chosen, based on the correlation curves computed from a motion-free dataset. Since the outer k-space region contains less signal, it is advantageous to use larger segment sizes in these regions. Therefore the segment size was chosen to be 4 lines for $k_y$<64 and 8 lines for $k_y$>64. For these images, the optimum ξ was found to be close to 1, and the FS extrapolation technique reduces to a simple thresholding operation, as shown in equation (4). Both translation-only and combined rotation/translation EXTRACT were applied to the motion-corrupted datasets. The precision for translational motion was ¼ pixels along both x and y axes, while a rotation range of θ=±1° in increments of ¼° were searched between adjacent k-space segments.

The effects of EXTRACT motion compensation on the trabecular bone architecture were investigated and compared to the results from navigator echo correction. Twenty six wrist datasets were processed to compute the 3D structural parameters of trabecular bone network, which serve as markers for disease progression or regression for osteoporosis. Four sets of images were generated for each exam: no correction, translation-only navigator correction, translation-only EXTRACT and combined rotation/translation EXTRACT. For each set of images, a cascade of processing was performed to compute following parameters: bone volume fraction (BVF), average trabecular thickness (Tb.Th) and topological parameters, including curve (C, the amount of rods in bone), surface (S, representing plates), profile-edges (PE, essentially double-layered curves), surface-to-curve ratio (S/C) and the erosion index (EI). The average changes in these parameters following motion correction with different techniques were compared.

The ability of the EXTRACT technique to correct for 3D rigid-body rotation and translation was also investigated in a preliminary in vivo time-of-flight (TOF) angiography study. Three volunteers were scanned using a 3D TOF sequence with following parameters: 200×200×51.2 mm³ FOV, 256× 256×64 matrix, TR/TE 40/6.0 ms. A pair of lateral head restraints were used, and each volunteer was instructed to nod his head back and forth several times during the scan, both abruptly and continuously. For comparison purposes, a motionless dataset was also acquired. Although the proposed technique can correct for full 6 degrees of freedom (DOF) of rigid-body motion, because of the use of the lateral head restraints and to reduce the computation time, 4 DOF motion was searched in this particular experiment, including 3D translation (x, y, z) and through-plane rotation $θ_x$ about the x-axis. From the motionless dataset, a larger initial base ($k_y$= [−16, 16]) was utilized for the extrapolated data to detect 3D rotation and translation accurately. From such an initial base, the EXTRACT technique was performed on adjacent k-space sections consisting of 8 contiguous phase-encoding ($k_y$) planes. In an example embodiment, extrapolation of 3D k-space data can be accomplished by first performing a one dimensional (1D) inverse FT along $k_z$ to separate the slices, then extrapolating in 2D $k_x$-$k_y$ plane for each slice, followed by a FT back to 3D k-space. For each 2D extrapolation, the edge-enhancement technique with a threshold of $T_{EE}$=5 (when the brightest pixel was scaled to 255) was used. A shearing method was utilized to perform 3D rotations, and a rotational range of ±10° was searched between adjacent segments with a precision of 1°. The translational search precision was 1 pixel along all three directions.

To further reduce the computation cost of 3D rotation and correlation, a region-of-interest (ROI) analysis was performed. For each motion-corrupted/extrapolated data segment pair, ROIs consisting of 100×100×20 pixels near the Circle of Willis (the cerebral arterial circle: a circle of arteries that supply blood to the brain) were selected from the reconstructed sub-images, created by zero-filled Fourier transforms of the data segments. The ROI of the motion-corrupted sub-image was then rotated by various angles, and for each angle, correlation was performed with the sub-image of the extrapolated reference via multiplication in k-space.

In this experiment, in addition to motion compensation using the EXTRACT technique, the motion-corrupted dataset was also corrected by correlating directly on a segment-by-segment basis with the motionless data acquired separately. Motionless data is thus used in lieu of the extrapolated motion-free reference. This provides a reference motion trajectory that can be used for comparison with those determined by EXTRACT. Axial and coronal maximal intensity projection (MIP) images were reconstructed for image quality comparisons.

Processing was carried out on a 3.0 GHz Pentium computer. In addition to visual inspection, the image qualities were evaluated by entropy E, known to be used to quantify image quality. The image quality improvement was then computed per equation (6) below.

$$Q = \frac{E_{corrected} - E_{corrupted}}{E_{motionless} - E_{corrupted}}. \quad (6)$$

Q=0 indicates no improvement, and Q=1 means that motion is completely compensated.

Figure 7:
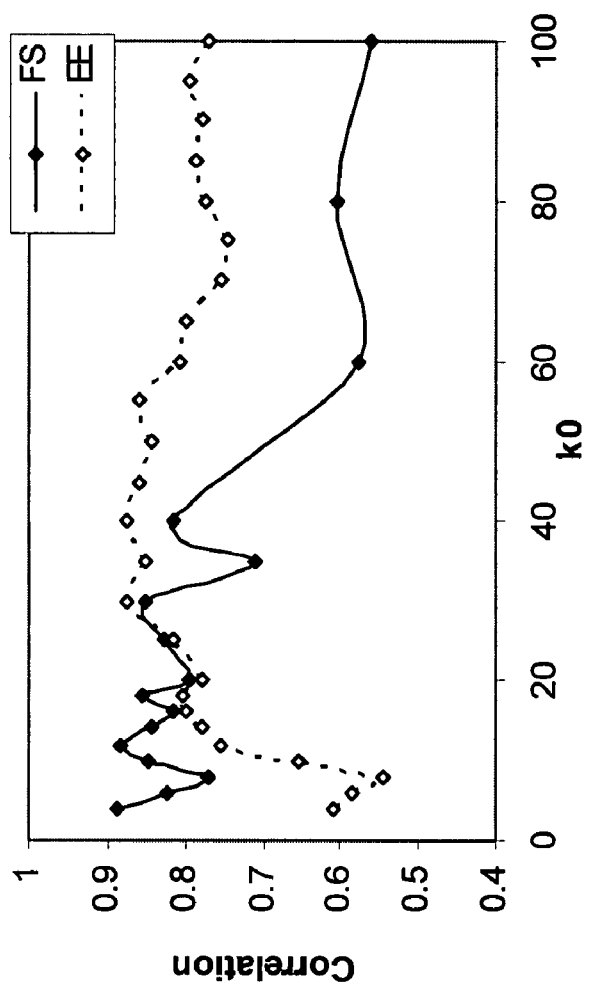
FIG. 7 is an example of plot of correlation value at different k-space locations.
Figure 8:
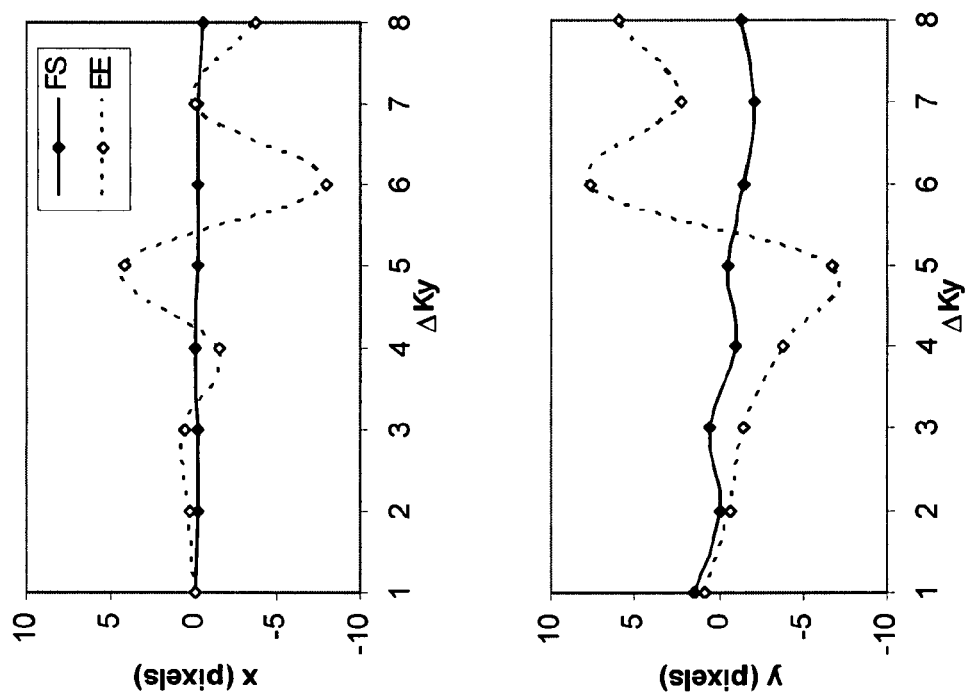
FIG. 8 is an example of motion estimation error for different $k_y$ lines when $k_0=8$.
Figure 9:
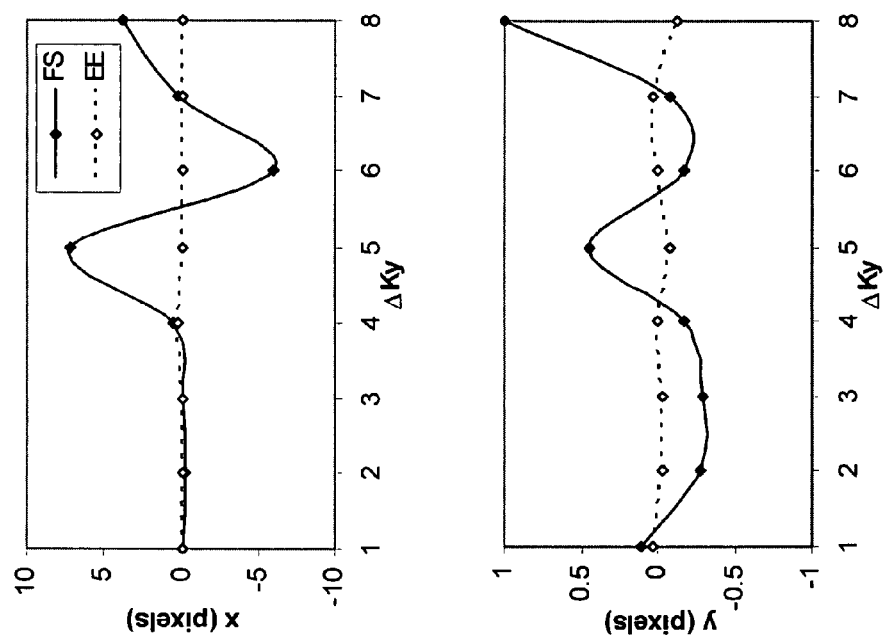
FIG. 9 is illustration example plots depicting motion estimation error for different $k_y$ lines when $k_0=8$.

FIG. 7, FIG. 8, and FIG. 9, illustrate results from the experiment comparing two different data extrapolation methods on a motion-less axial image of the head. For segments near the k-space center, the FS extrapolation technique generates higher correlation values. In contrast, for segments in the outer k-space regions, the EE extrapolation technique generates higher correlation values as depicted in FIG. 7. Consistent with this observation, as depicted in FIG. 8, the FS extrapolation technique results in smaller error in the detected motion in the central k-space locations. In FIG. 8, $Δk_y$ indicates the distance from the edge of the base. As depicted in FIG. 9, the EE extrapolation technique results in less error in the outer k-space regions. In FIG. 9, $Δk_y$ indicates the distance from the edge of the base. This suggests that the FS extrapolation technique extrapolates k-space better near the k-space center, and the EE extrapolation technique is better in the outer regions. This trend was observed for several different MR images tested, despite their different image features, although the cross-over point ($k_1$) may be different for different types of images. FIG. 8 and FIG. 9 also show that motion estimation error generally increases with distance $Δk_y$ from the edge of the base. This is a factor to consider when choosing an appropriate segment size.

Figure 10:
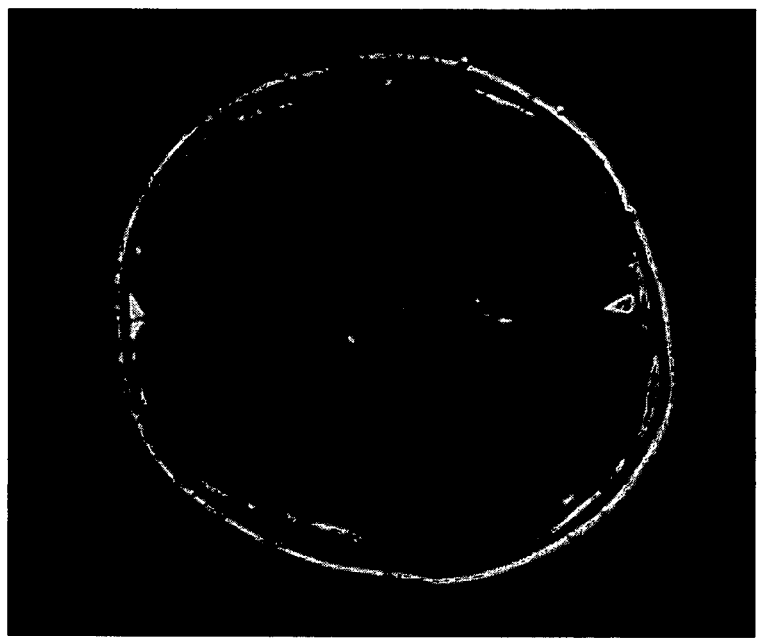
FIG. 10 is a depiction of an example motion free image.
Figure 11:
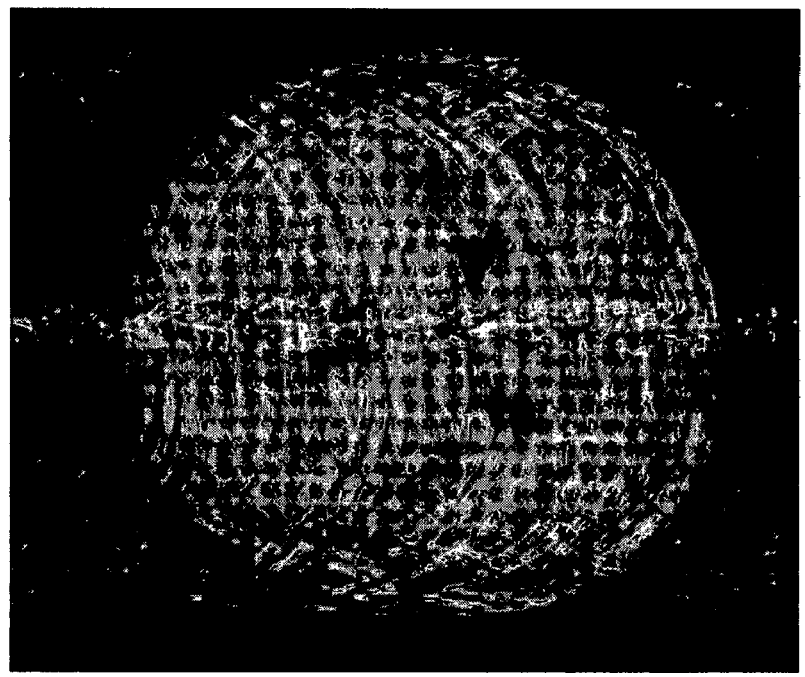
FIG. 11 depict depicts an example motion-corrupted image.
Figure 12:
FIG. 12 depicts an example motion-compensated image.
Figure 13:
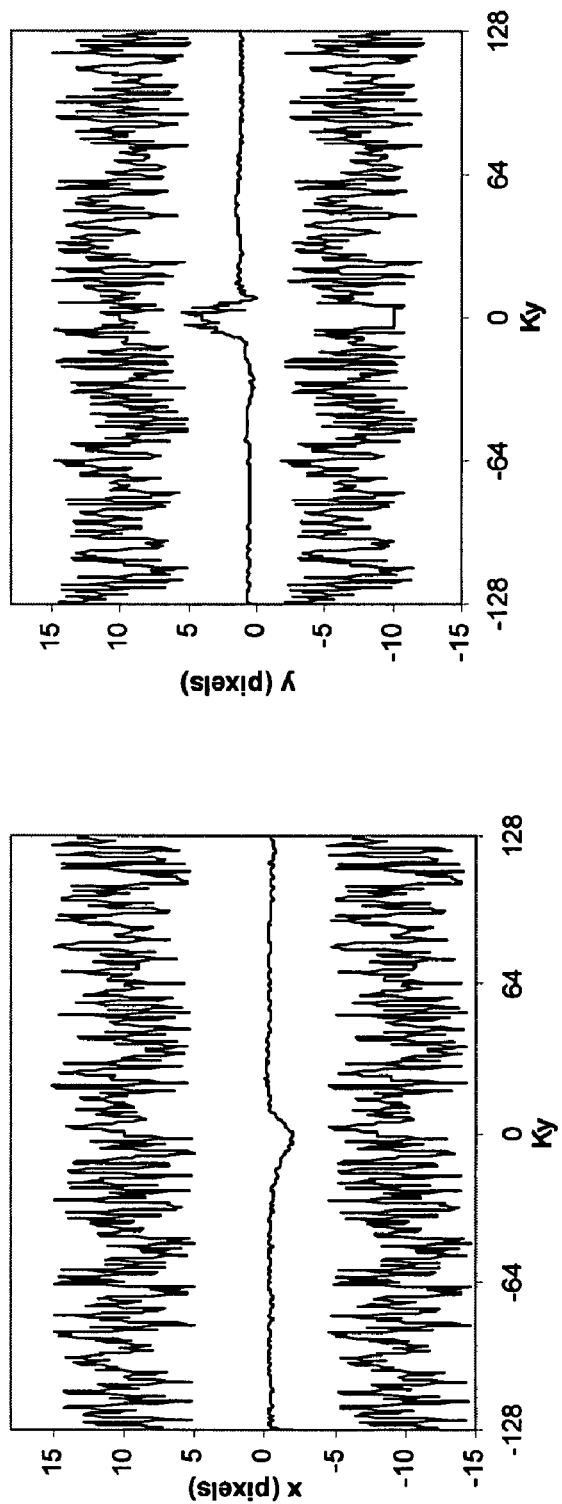
FIG. 13 depicts example plots of estimated motion used to reconstruct the image.

The results from the simulated motion experiment are shown in FIG. 10, FIG. 11, FIG. 12, and FIG. 13. These results demonstrate the effectiveness of the EXTRACT technique for compensating random view-by-view 2D translation on a raw MR data set. FIG. 10 depicts the original motion-free image. As depicted in FIG. 11, motion causes severe blurring and ghosting artifacts. Application of the EXTRACT technique resulted in the image depicted in FIG. 12. The image depicted in FIG. 12 was obtained, via the EXTRACT technique, with a computation time of approximately 5 minutes.

The motion-corrected image (FIG. 12) is nearly indistinguishable from the original motion-free image (FIG. 10). The image quality improved by Q=0.83 as gauged by entropy. The applied and recovered motion trajectories are compared in graphs shown in FIG. 13. In general, the two trajectories agreed well, although deviation tends increase near the k-space center, particularly for motion along the phase-encode (y) direction. However, the error in the phase-encoding axis near k-space center does not significantly affect the overall image quality because the phase deviations corresponding to the shifts are relatively small. Although the initial motionless base was chosen to consist of only 3 central $k_y$ lines (from $k_y=-1$ to 1), the EXTRACT technique was nonetheless able to gradually build up a base that is motion-free.

Figure 14:
FIG. 14 is an example depiction of a motion free image.
Figure 14:
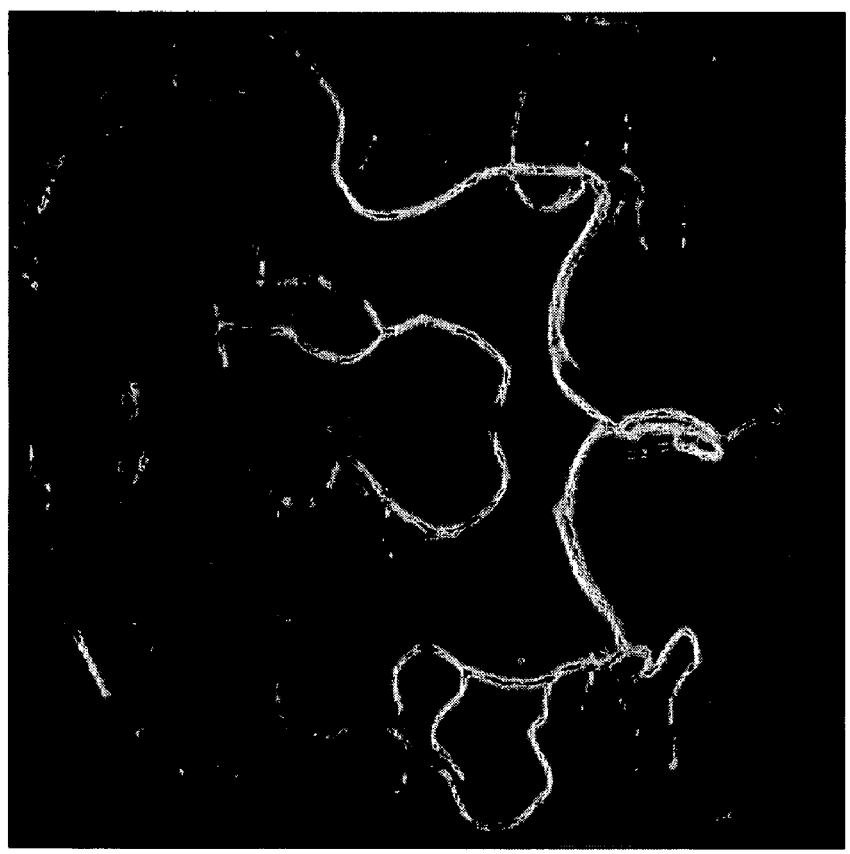
Figure 15:
FIG. 15 is an example depiction of a motion-corrupted image.
Figure 16:
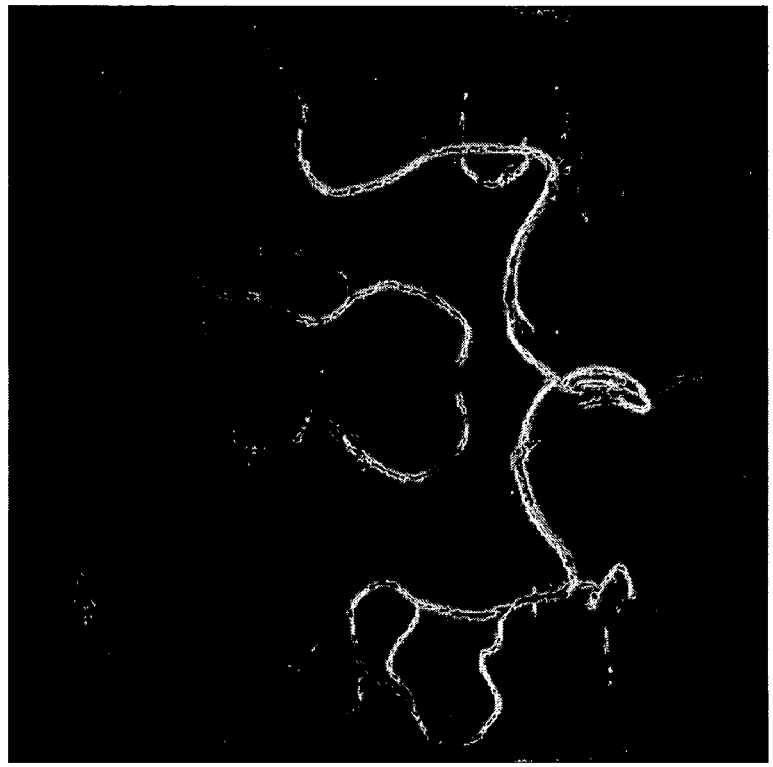
FIG. 16 is a depiction of a motion-compensated image.
Figure 17:
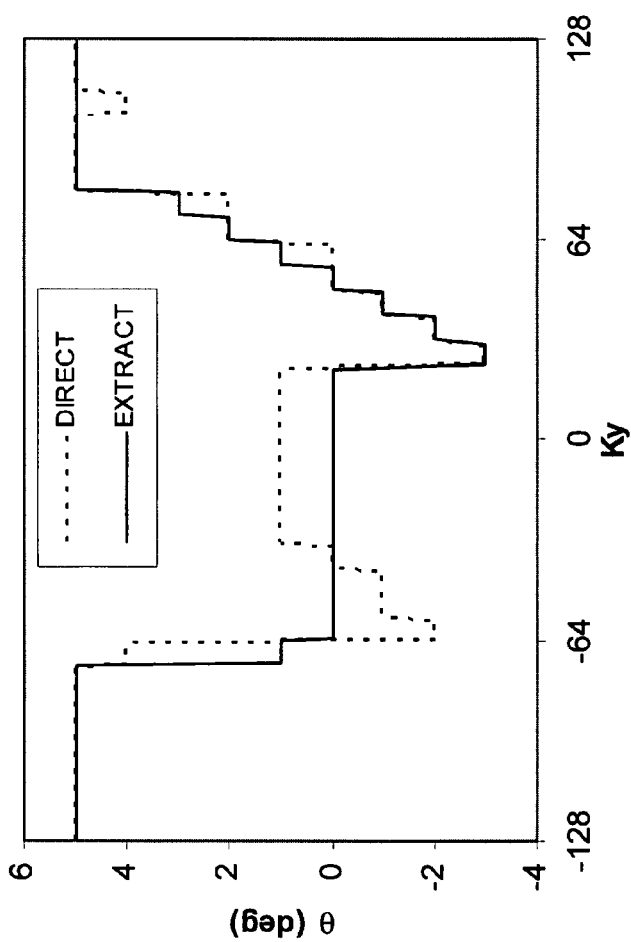
FIG. 17 is an example plot comparing recovered motion.

FIG. 14, FIG. 15, FIG. 16, and FIG. 17 depict results of an example of motion correction in 3D Time of Flight angiography images. Axial MIP images from a 3D angiography are illustrated in FIG. 14, FIG. 15, and FIG. 16. FIG. 14 is an example depiction of a motion free image. FIG. 15 depicts a motion-corrupted image. FIG. 16 depicts a motion-compensated image. FIG. 17 depict plots comparing recovered motion. Severe image ghosting was reduced and smaller vessels restored after motion compensation. The plot of FIG. 25 illustrates the motion component with the largest variation, through-plane rotation $\theta_x$, indicating a motional range of 8.0 degrees. Motion trajectories detected by EXTRACT generally agrees well with results obtained from a direct correlation with a separately-acquired motion-free data set, both indicating two sudden and one gradual nodding motion. The motion compensation time for each experiment was approximately 10 minutes. The entropy improved by an average Q=0.52 for the three experiments.

The EXTRACT technique of k-space extrapolation and correlation for motion artifact compensation in MRI eliminates the need to collect navigator data. Further, in-plane translational and rotational correction could be completed typically in a matter of seconds. In addition, there is no need to preset the search range of translational motion, therefore rendering a more robust correction in the presence of large translational shifts.

Figure 18:
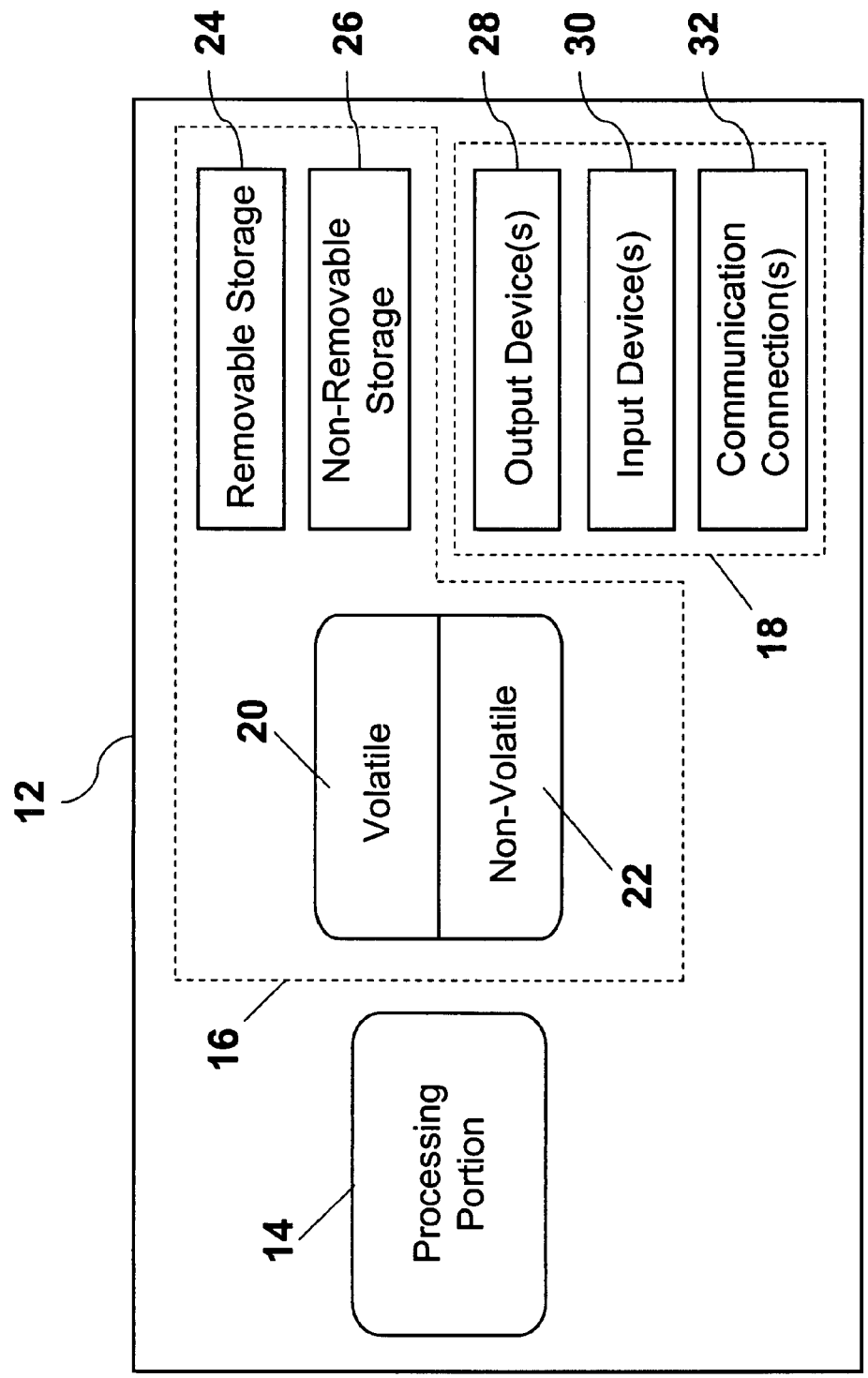
FIG. 18 is a diagram of an exemplary computing device for motion artifact compensation.

FIG. 18 is a diagram of an exemplary computing device 12 for motion artifact compensation. The computing device 12 can be implemented as a client processor and/or a server processor. The computing device 12 comprises a processing portion 14, a memory portion 16, and an input/output portion 18. The processing portion 14, memory portion 16, and input/output portion 18 are coupled together (coupling not shown in FIG. 18) to allow communications therebetween. The processing portion 14 is capable of performing the operations to compensate for motion of an object in magnetic field. For example, the processing portion 14 is capable of selecting a first portion of a time domain representation of a magnetic resonance image of the object within the magnetic field, selecting a second portion of the time domain representation, extrapolating from the first portion to the second portion motion data indicative of motion of the object, generating reference data from the extrapolated data, utilizing a multiple extrapolation techniques, and compensating for motion in the second portion in accordance with the extrapolated reference data. The processing portion 14 also is capable of processing the compensated data for conversation to compensated image data.

The memory portion 16 is capable of storing all parameters associated with compensating for motion of an object in magnetic field as described herein. For example, the memory portion 16 is capable of storing extrapolated data, compensated data, reference data, values indicative of the various k-space segment sizes, and image data. The input/output portion 18 is capable of providing and/or receiving components utilized to compensate for motion of an object in magnetic field. For example, the input/output portion 18 is capable of receiving time domain data and providing compensated image data.

Depending upon the exact configuration and type of processor, the memory portion 16 can be volatile (such as RAM and/or cache) 20, non-volatile (such as ROM, flash memory, etc.) 22, or a combination thereof. The computing device 12 can have additional features/functionality. For example, the computing device 12 can include additional storage (removable storage 24 and/or non-removable storage 26) including, but not limited to, magnetic or optical disks, tape, flash, smart cards or a combination thereof. Computer storage media, such as memory portion 16, 20, 22, 24, and 26, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the computing device 12. Any such computer storage media can be part of the computing device 12.

The computing device 12 also can contain communications connection(s) 32 that allow the computing device 12 to communicate with other devices. Communications connection(s) 32 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. The term computer readable media as used herein includes both storage media and communication media. The computing device 12 also can have input device(s) 30 such as keyboard, mouse, pen, voice input device, touch input device, etc. Output device(s) 28 such as a display, speakers, printer, etc. also can be included.

The various techniques described herein can be implemented in connection with hardware or software or, where appropriate, with a combination of both. Thus, the methods and apparatuses described herein, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The program code can be implemented in a high level procedural or object oriented programming language to communicate with a computer. The program(s) can be implemented in assembly or machine language, if desired. In any case, the language can be a compiled or interpreted language, and combined with hardware implementations.

The program code can be transmitted over a transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder, or the like, the receiving machine becomes an apparatus for practicing the invention. When implemented on a general-purpose processor, the program code combines with the processor to provide a unique apparatus that operates to invoke the functionality of motion artifact compensation. Additionally, any storage techniques can invariably be a combination of hardware and software.

While illustrative embodiments have various figures, it is to be understood that other similar embodiments can be used or modifications and additions can be made to the described embodiments for performing motion artifact compensation without deviating therefrom. Therefore, motion artifact compensation should not be limited to any single embodiment, but rather should be construed in breadth and scope in accordance with the appended claims.

APPENDIX

In a rectilinearly sampled MR sequence, a translation of $(\Delta x, \Delta y)$ in a k-space segment S induces a phase in the acquired k-space data:

$$S_{(\Delta x, \Delta y)} = S_{(0,0)} \exp[-j2\pi(k_x \Delta x + k_y \Delta y)]. \quad (A.1)$$

Here, the subscripts indicate the translational shift. The correlation function of the motion-free and corrupted sub-images reconstructed from segment S is $$\begin{aligned} C(x, y) &= FT^{-1}\{S_{(\Delta x, \Delta y)} \times S^*_{(0,0)}\} \\ &= FT^{-1}\{|S(k_x, k_y)|^2 \exp[-j2\pi(k_x \Delta x + k_y \Delta y)]\} \\ &= \sum_{k_x k_y} |S(k_x, k_y)|^2 \exp\{j2\pi[k_x(x-\Delta x) + k_y(y-\Delta y)]\} \end{aligned} \quad (A.2)$$

For a segment comprised of only one phase-encoding line, $k_y$ is a constant ($k_y = k_0$). (A.2) could then be simplified to:

$$\begin{aligned} C(x, y) &= \exp[j2\pi k_0(y-\Delta y)] \sum_{k_x} \left\{ \begin{array}{l} |S(k_x, k_0)|^2 \exp \\ [j2\pi k_x(x-\Delta x)] \end{array} \right\} \\ &= \exp[j2\pi k_0(y-\Delta y)] A(x-\Delta x), \end{aligned} \quad (A.3)$$

with $$\begin{aligned} A(x) &= \sum_{k_x} [|S(k_x, k_0)|^2 \exp[j2\pi k_x x]] \\ &= FT^{-1}[|S(k_x, k_0)|^2]. \end{aligned} \quad (A.4)$$

Since multiplication in k-space corresponds to convolution in image-space, (A.4) is equivalent to $$A(x) = \int f(t)f(x-t)dt, f(x) = FT^{-1}(S(k_x, k_0)). \quad (A.5)$$

A(x) is the auto-correlation function of f(x), which is the inverse FFT of the phase-encoding line.

What is claimed:

1. A method comprising:
providing a representation of an image of an object;
selecting a first portion of the representation;
selecting a second portion of the representation;
extrapolating, in accordance with a first extrapolation technique, data from a first region of the first portion;
extrapolating, in accordance with a second extrapolation technique, data from a second region of the first portion, wherein the first region differs from the second region;
combining a result of the first extrapolation technique and a result of the second extrapolation technique for obtaining extrapolated reference data; and
utilizing the extrapolated reference data to compensate, in the second portion, for motion of the object.

2. A method in accordance with claim 1, wherein:
the first region comprises an inner region of the first portion; and the second region comprises an outer region of the first portion.

3. A method in accordance with claim 1, further comprising utilizing a plurality of representations of an image of the object for generating the first portion.

4. A method in accordance with claim 1, wherein:
the object is within a magnetic field; and
the representation of the object comprises a representation of a magnetic resonance image of the object.

5. A method in accordance with claim 1, further comprising:
subsequently selecting portions of the representation, wherein, each subsequently selected portion of the representation is adjacent, in the representation, to an immediate previously selected portion of the representation; and
for each subsequently selected representation:
extrapolating data from an accumulation of all previously selected portions to the subsequently selected portion; and
utilizing the extrapolated data to compensate, in the subsequently selected portion, for motion of the object.

6. A method in accordance with claim 5, wherein:
the first portion comprises a central region of the representation;
the second portion comprises regions positioned outward from and adjacent to the central region; and
each subsequently selected portion comprises regions positioned outward from and adjacent to immediate previously selected regions.

7. A method in accordance with claim 1, further comprising rendering an image indicative of compensated representation of the object.

8. A method in accordance with claim 1, wherein the first portion is an indicative of a motion free representation of the object.

9. A method in accordance with claim 1, wherein the representation comprises a k-space representation of the object in a magnetic field.

10. A method in accordance with claim 9, wherein each subsequent portion is selected in a phase encoding direction of the representation.

11. A method in accordance with claim 1, wherein extrapolating comprises:
transforming the first portion in the representation to an image; enhancing the image; and
transforming the enhanced image to a representation.

12. A method in accordance with claim 1, wherein utilizing the extrapolated reference data to compensate, in the second portion, for motion of the object comprises cross correlating the extrapolated motion data with data indicative of the second portion.

13. A method in accordance with claim 12, further comprising:
   determining, from a result of the cross correlating, motion-indicative data indicative of motion of the object; and
   utilizing the determined motion to motion-compensate the second portion.

14. A system comprising:
   a processing portion configured to:
      select a first portion of a representation of an image of an object;
      select a second portion of the representation;
      extrapolate, in accordance with a first extrapolation technique, data from a first region of the first portion;
      extrapolate, in accordance with a second extrapolation technique, data from a second region of the first portion, wherein the first region differs from the second region; and
      combine a result of the first extrapolation technique and a result of the second extrapolation technique to obtain extrapolated reference data; and
      utilize the extrapolated reference data to compensate, in the second portion, for motion of the object; and
   an input/output portion configured to:
      receive the representation of the image of the object; and
      provide compensated data.

15. A system in accordance with claim 14, wherein:
   the first region comprises an inner region of the first portion; and
   the second region comprises an outer region of the first portion.

16. A system in accordance with claim 14, the processing portion further configured to utilize a plurality of representations of an image of the object to generate the first portion.

17. A system in accordance with claim 14, wherein:
   the object is within a magnetic field; and
   the representation of the object comprises a representation of a magnetic resonance image of the object.

18. A system in accordance with claim 14, the processing portion further configured to:
   subsequently select portions of the representation, wherein, each subsequently selected portion of the representation is adjacent, in the representation, to an immediate previously selected portion of the representation; and
   for each subsequently selected representation:
   extrapolating data from an accumulation of all previously selected portions to the subsequently selected portion; and
   utilize the extrapolated data to compensate, in the subsequently selected portion, for motion of the object.

19. A system in accordance with claim 18, wherein:
   the first portion comprises a central region of the representation;
   the second portion comprises regions positioned outward from and adjacent to the central region; and
   each subsequently selected portion comprises regions positioned outward from and adjacent to immediate previously selected regions.

20. A system in accordance with claim 14, the processing portion further configured to render an image indicative of the compensated representation of the object.

21. A system in accordance with claim 14, wherein the first portion is indication of a motion free representation of the object within a magnetic field.

22. A system in accordance with claim 14, wherein the representation comprises a k-space representation of the object in a magnetic field.

23. A system in accordance with claim 22, wherein each subsequent portion is selected in a phase encoding direction of the representation.

24. A system in accordance with claim 14, wherein the processing portion extrapolates by:
   transforming the first portion in the representation to an image; enhancing the image; and
   transforming the enhanced image to a representation.

25. A system in accordance with claim 14, wherein the processing portion utilizes the extrapolated reference data to compensate, in the second portion, for motion of the object by cross correlating the extrapolated motion data with data indicative of the second portion.

26. A system in accordance with claim 25, the processing portion further configured to:
   determine, from a result of the cross correlation, motion-indicative data indicative of motion of the object in the magnetic field; and
   utilizing the determined motion to motion-compensate for motion in the second portion.

27. A system in accordance with claim 14, wherein a size of the first portion is indicative of an accuracy of an estimate of an amount of motion of the object.

28. A computer-readable storage medium having computer-executable instructions stored thereon, the computer-executable instructions, when executed by a processor, perform operations comprising:
   selecting a first portion of a representation of an image of the object;
   selecting a second portion of the representation;
   extrapolating, in accordance with a first extrapolation technique, data from a first region of the first portion;
   extrapolating, in accordance with a second extrapolation technique, data from a second region of the first portion, wherein the first region differs from the second region;
   combining a result of the first extrapolation technique and a result of the second extrapolation technique for obtaining extrapolated reference data; and
   utilizing the extrapolated reference data to compensate, in the second portion, for motion of the object.

29. A computer-readable storage medium in accordance with claim 28 wherein: the first region comprises an inner region of the first portion; and
   the second region comprises an outer region of the first portion.

30. A computer-readable storage medium in accordance with claim 28, the computer-executable instructions further for utilizing a plurality of representations of an image of the object for generating the first portion.

31. A computer-readable storage medium in accordance with claim 28 wherein:
   the object is within a magnetic field; and
   the representation of the object comprises a representation of a magnetic resonance image of the object.

32. A computer-readable storage medium in accordance with claim 28, the computer-executable instructions further for:
   subsequently selecting portions of the representation, wherein, each subsequently selected portion of the representation is adjacent, in the representation, to an immediate previously selected portion of the representation; and
   for each subsequently selected representation:
   extrapolating data from an accumulation of all previously selected portions to the subsequently selected portion for generating extrapolated data; and utilizing the extrapolated data to compensate, in the subsequently selected portion, for motion of the object.

33. A computer-readable storage medium in accordance with claim 32, wherein:
the first portion comprises a central region of the representation;
the second portion comprises regions positioned outward from and adjacent to the central region; and
each subsequently selected portion comprises regions positioned outward from and adjacent to immediate previously selected regions.

34. A computer-readable storage medium in accordance with claim 28, having further executable instructions for rendering an image indicative of the compensated representation of the object.

35. A computer-readable storage medium in accordance with claim 28, having further executable instructions for assuming the first portion is indicative of a motion free representation of the object within the magnetic field.

36. A computer-readable storage medium in accordance with claim 28, wherein the representation comprises k-space representation of the object in a magnetic field.

37. A computer-readable storage medium in accordance with claim 36, wherein each subsequent portion is selected in a phase encoding direction of the representation.

38. A computer-readable storage medium in accordance with claim 28, wherein extrapolating comprises:
transforming the first portion in the representation to an image; enhancing the image; and
transforming the enhanced image to a representation.

39. A computer-readable storage medium in accordance with claim 28, wherein utilizing the extrapolated reference data to compensate, in the second portion, for motion of the object comprises cross correlating the extrapolated motion data with data indicative of the second portion.

40. A computer-readable storage medium in accordance with claim 39, having further executable instructions for:
determining, from a result of the cross correlation, motion-indicative data indicative of motion of the object in the magnetic field; and
utilizing the determined motion to motion-compensate for motion in the second portion.

* * * * *